(12) United States Patent
Neidert

(10) Patent No.: US 6,176,513 B1
(45) Date of Patent: *Jan. 23, 2001

(54) VEHICLE GAS BAG PROVIDING LATERAL PROTECTION

(75) Inventor: Rudolf Neidert, Hosenfeld (DE)

(73) Assignee: TRW Occupant Restraint Systems GmbH, Alfdorf (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/936,502

(22) Filed: Sep. 24, 1997

(30) Foreign Application Priority Data

Sep. 27, 1996 (DE) .......................... 296 16 904 U

(51) Int. Cl.$^7$ .......................... B60R 21/22; B60R 21/24
(52) U.S. Cl. .......................... 280/729; 280/730.2
(58) Field of Search .......................... 280/730.2, 730.1, 280/729, 743.1

(56) References Cited

U.S. PATENT DOCUMENTS

| | | |
|---|---|---|
| 3,510,150 | 5/1970 | Wilfert . |
| 5,470,103 | 11/1995 | Vaillancourt et al. ............ 280/730.1 |
| 5,480,181 | * 1/1996 | Bark et al. ........................ 280/730.2 |
| 5,524,924 | 6/1996 | Steffens, Jr. et al. . |
| 5,588,672 | * 12/1996 | Karlow et al. .................... 280/730.2 |
| 5,755,457 | * 5/1998 | Specht .............................. 280/730.2 |
| 5,788,270 | * 8/1998 | Haland et al. ................... 280/730.2 |
| 5,957,487 | * 9/1999 | Stutz ................................. 280/730.2 |

FOREIGN PATENT DOCUMENTS

| | | | |
|---|---|---|---|
| 29605896 U | 9/1996 | (DE) . | |
| 29614201 U | 11/1996 | (DE) . | |
| 2191450 | * 12/1987 | (GB) | ............................. 280/730.2 |
| 2297950 | 8/1996 | (GB) . | |
| 6-227340 | * 8/1994 | (JP) | .................................. 280/730.2 |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A vehicle occupant protection device incorporated into a vehicle with an A-pillar and a B-pillar, comprises an inflatable head-side gas bag extending from the A-pillar up to at least the B-pillar of the vehicle and a gas generator. The gas bag has a front section which covers the A-pillar at least to a major extent in the inflated condition of the gas bag and in the case of an offset head-on collision and a skew front-end collision prevents head contact with the A-pillar.

16 Claims, 3 Drawing Sheets

VEHICLE GAS BAG PROVIDING LATERAL PROTECTION

FIELD OF THE INVENTION

The invention relates to a vehicle occupant protection means comprising an inflatable head-side gas bag.

BACKGROUND OF THE INVENTION

A protection means with a gas bag intended to protect the head of a vehicle occupant from coming into contact with the side window in the case of vehicle side impact is known from DE 296 05 896. The head-side gas bag provided in this case is secured by its front and rear end to the A-pillar and C-pillar, respectively, and covers the two side windows and the B-pillar.

Side-impact protection means offer protection, however, only in the case of a collision occuring in a direction of 90°±30° to the vehicle longitudinal axis. In the case of a head-on collision or a collision at an angle of 0°±60° to the vehicle longitudinal axis the conventional gas bag on the driver's side or at the front passenger side is intended to offer protection. In the case of an offset head-on collision in which the shock affecting the vehicle is not introduced into the vehicle in the region of the vehicle center line, or in the case of a skew front-end collision it is, however, possible that the vehicle occupant slides along the driver or front passenger gas bag so that his head comes into contact with the A-pillar.

SUMMARY OF THE INVENTION

The invention provides a vehicle occupant protection means which considerably reduces the risk of head injuries in the case of an offset head-on collision or skew front-end collision. The vehicle occupant protection means according to the invention is incorporated into a vehicle with at least an A-pillar and a B-pillar and comprises an inflatable head-side gas bag extending from the A-pillar up to at least the B-pillar of the vehicle and a gas generator. The gas bag has a front section which covers the A-pillar at least to a major extent in the inflated condition of the gas bag and in the case of an offset head-on collision and a skew front-end collision prevents head contact with the A-pillar.

The A-pillar, which in the case of side-impact protection means known hitherto merely serves as an anchoring means for the side gas bag, is in the case of the protection means in accordance with the invention covered at least to a major extent by the head-side gas bag.

In the preferred embodiment the gas bag is a multi-chamber gas bag and the front section is formed by a separate chamber which may be flowingly connected to the one or other remaining chamber or chambers of the gas bag or separated therefrom so that accordingly a multi-stage gas generator for inflating the chambers or a separate gas generator for the chamber covering the A-pillar is provided. If several gas generators are provided there is the advantage that depending on the nature of the collision either the chamber covering the side window or that covering the A-pillar is inflated. In borderline cases, particularly in the case of a collision at an angle of approx. 60° to the vehicle longitudinal axis both chambers are inflated.

Furthermore, it is provided for in a preferred embodiment that the inflated head-side gas bag extends up to the C-pillar of the vehicle, thus providing protection means for front and rear occupants equivalently.

DETAILED DESCRIPTION OF PREFERRED EMBODIMENTS

Figure 1:
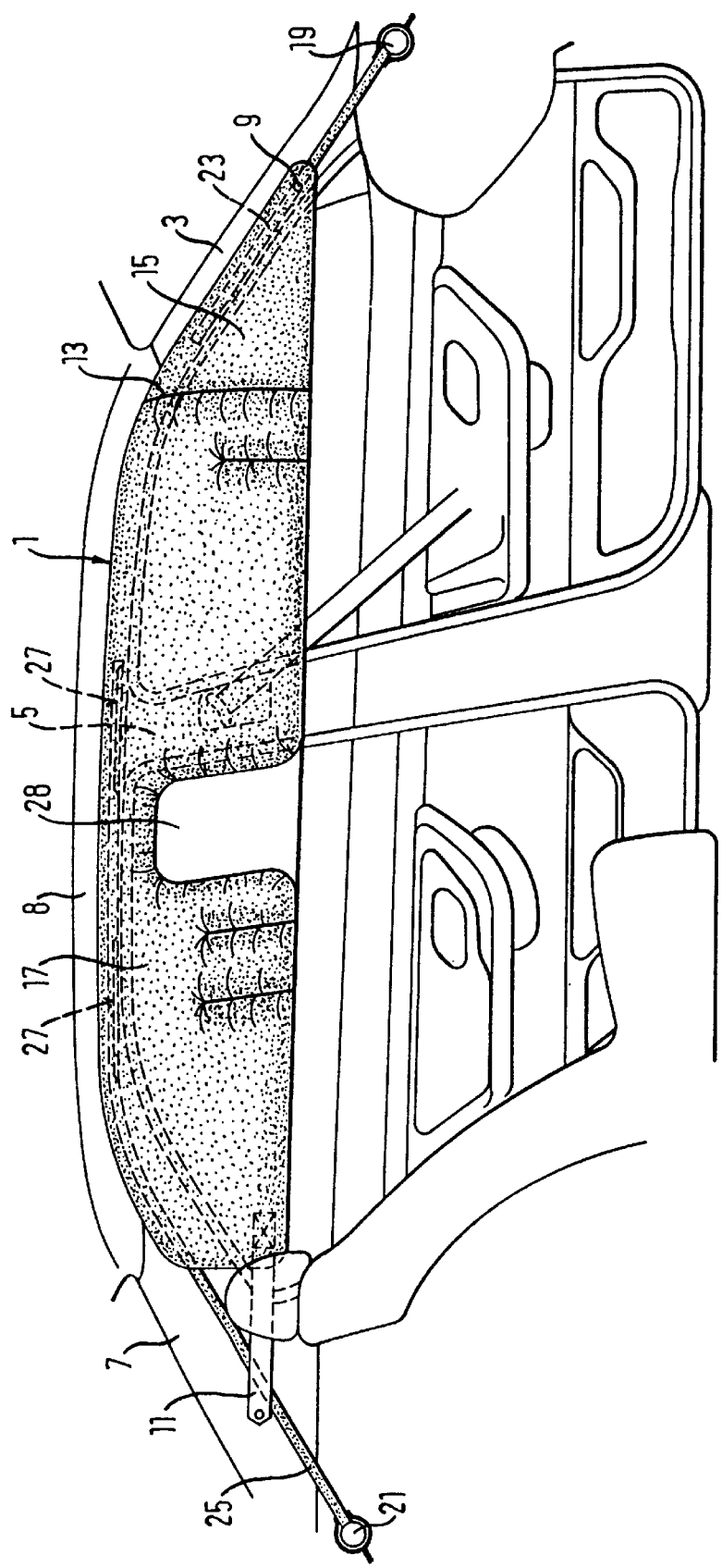
FIG. 1 is a side view of a first embodiment of the protection means in accordance with the invention, including a head-side gas bag, all of the chambers of which are inflated.

In FIG. 1 a vehicle occupant protection means is shown, including a head-side gas bag which, in the inflated condition, extends from the A-pillar 3 via the B-pillar 5 up to the C-pillar 7. In the non-inflated condition the gas bag 1 is disposed concealed under the cover of the A-pillar and the C-pillar as well as of the side roof pillar 8. In the region of its front and rear lower ends the gas bag 1 is connected via an eyelet 9 or a band 11 to the A-pillar 3 and C-pillar 7, respectively. Furthermore, arresting means (not shown) are provided in the region of the upper edge of the gas bag 1 where it is secured to the roof pillar 8. The gas bag 1 comprises two chambers which are separated from each other by a wall 13. The front chamber 15, forming the front section of the gas bag 1, extends in the inflated condition over the A-pillar 3 and prevents the head of the occupant from coming into contact with the A-pillar 3 in the case of an offset head-on collision or a skew front-end collision. The rear chamber 17 extends over the front side window, the B-pillar 5 and the rear side window up to the C-pillar 7. The rear chamber 17 offers protection means particularly for the head of the occupant in the case of a side impact occuring at an angle of 90°±30° to the vehicle longitudinal axis. Immediately behind the B-pillar 5, the rear chamber 17 features a spacious recess 28. Since the head of a rear vehicle occupant, even in the case of a skew front-end collision, is unable to move in this region, the head-side gas bag 1 may be recessed in this region to reduce the volume needing to be inflated.

For inflating the gas bag 1 in the case of an accident, a separate gas generator 19 and 21, respectively, is provided for each chamber 15 and 17. The gas generator 19 for the front chamber 15 is arranged in the side region of the dashboard. A flow passage 23 connects the gas generator 19 to the interior of the chamber 15.

The gas generator 21 arranged in the region of the lower end of the C-pillar 7 is in connection with the interior of chamber 17 via a flow passage 25 which extends up to the roof pillar 8 and features spacious outflow ports 27.

The gas bag 1 shown fully inflated in FIG. 1 has a spacious, cushion-shaped configuration and protects the head of the vehicle occupant from impacting the A-pillar 3, the roof pillar 8, the side windows, the B-pillar 5 and the C-pillar 7 in both the case of an offset head-on collision, i.e. in the case of a shock introduced at an angle of 0° to the vehicle longitudinal axis, but offset thereto, and in the case of a side impact at an angle of less than and more than 90° with respect to the vehicle longitudinal axis.

Figure 2:
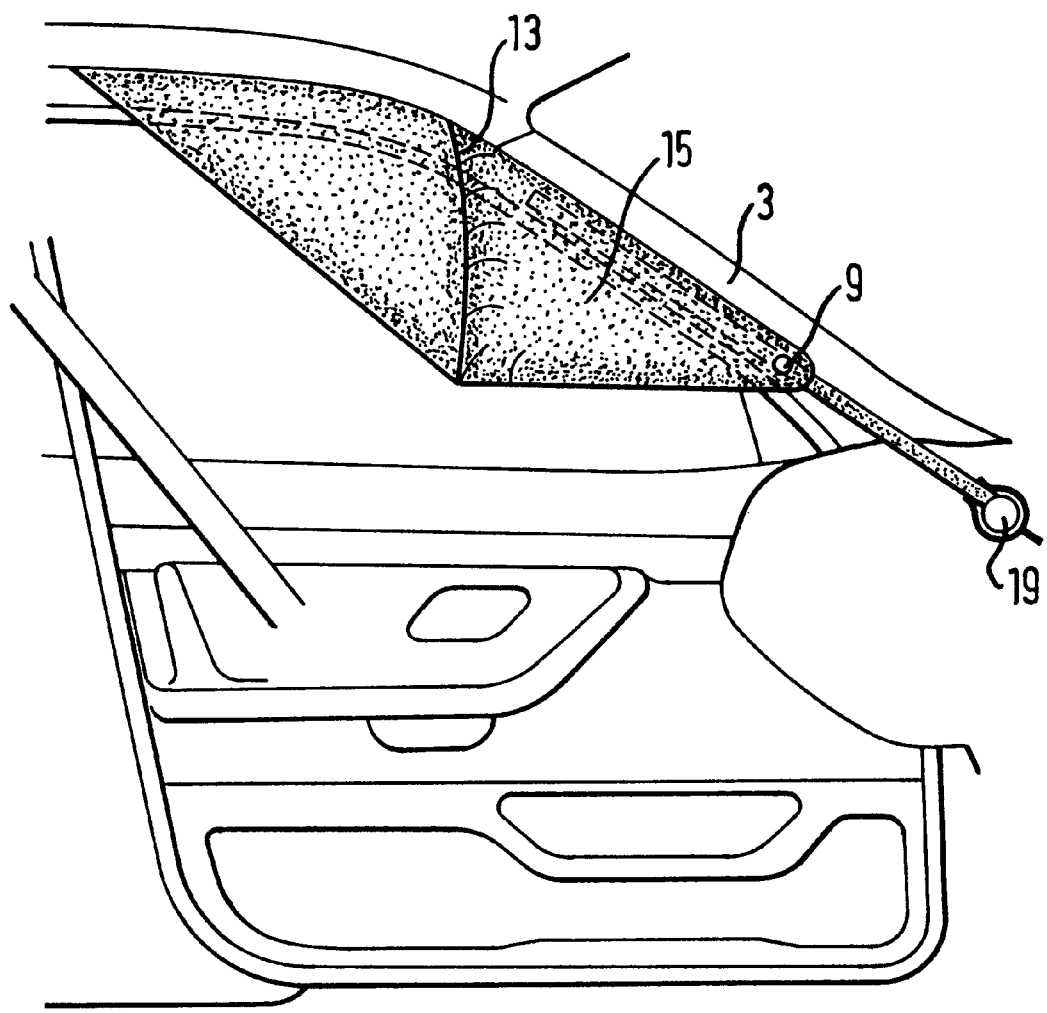
FIG. 2 shows the protection means shown in FIG. 1 in which only the front chamber is inflated.

The front chamber 15 serving to cover the A-pillar 3 may be inflated independently of the rear chamber 17. For this purpose the gas generator 19 has its own activating sensor (not shown) which initiates ignition of the gas generator 19 in the case of an offset head-on collision or a skew front-end collision. In this arrangement the sensor is able to sense a side impact up to an angle of 60° to the vehicle longitudinal axis. Since the corresponding sensor is disposed for the gas generator 21 so that it is able to sense a side impact at an angle of 90°± approx. 40°, accident situations exist in which only the front chamber 15 is inflated, as is shown in FIG. 2, in which both chambers 15, 17 are inflated, as shown in FIG. 1, or in which only the rear chamber 17 is inflated (not shown).

Figure 3:
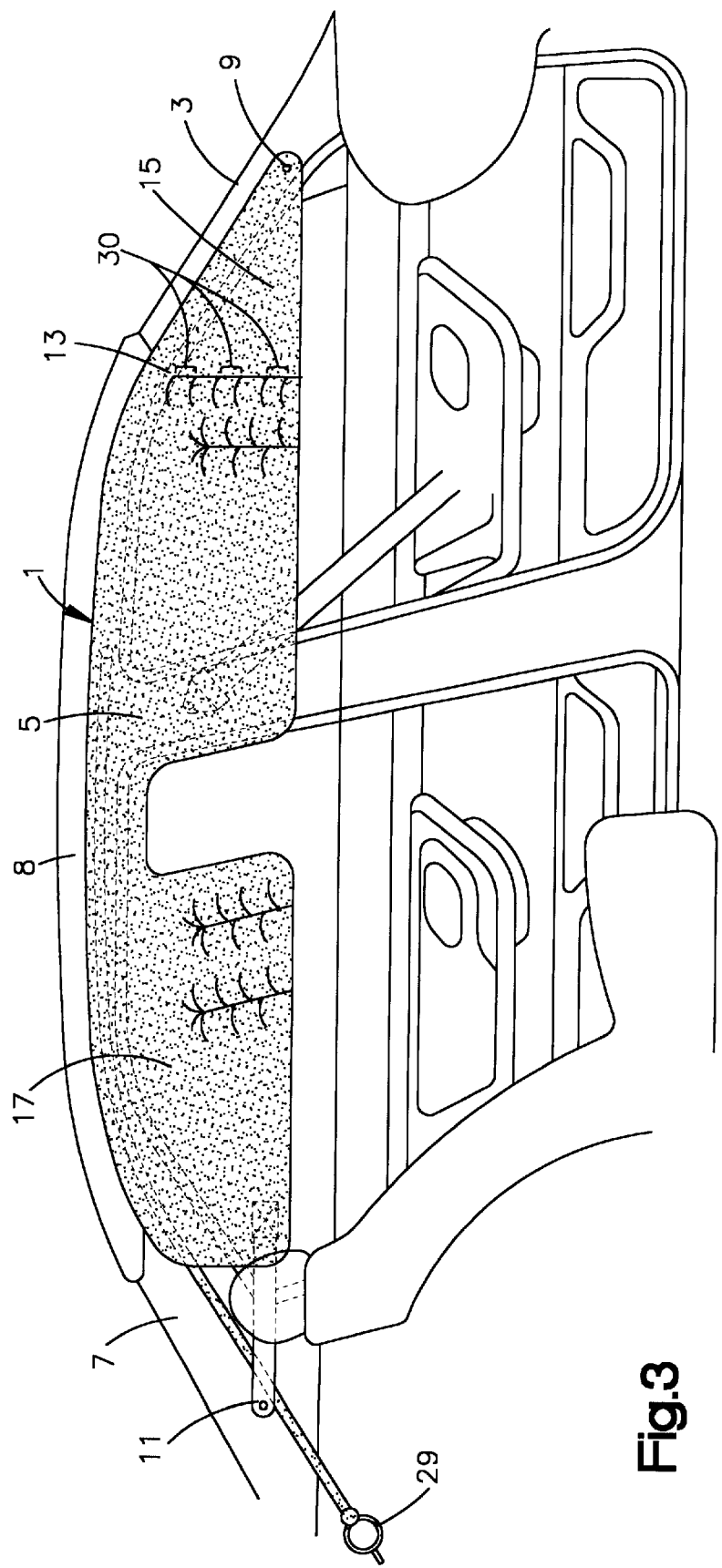
FIG. 3 is a side view of a second embodiment of the protection means in accordance with the invention.

The embodiment shown in FIG. 3 corresponds substantially to the embodiment shown in the previous Figures, the difference with respect to the first embodiment being only one gas generator 29 provided as a multi-stage gas generator thus eliminating the gas generator 19. The wall 13 features several passage ports shown schematically at 30 which are opened as of a specific gas bag interior pressure. Depending on whether one or both chambers 15, 17 are to be inflated, one or more stages of the gas generator 29 are ignited so that only the chamber 17 or also, in addition thereto, the chamber 15 is inflated.

What is claimed is:

1. A vehicle occupant protection means incorporated into a vehicle with an A-pillar and a B-pillar and a front side window, said protection means comprising an inflatable head-side gas bag having a deflated condition and an inflated condition and extending from said A-pillar up to at least said B-pillar of said vehicle and at least one gas generator, said gas bag comprising a front section which covers said A-pillar at least to a major extent in the inflated condition of said gas bag and in the case of an offset head-on collision and a skew front-end collision prevents head contact with said A-pillar, said head-side gas bag taking a spacious, cushion-shaped configuration in its inflated condition, covering said front side window to a major extent and having several chambers, one of said chambers extending over said front side window of said vehicle and one of said chambers for covering said A-pillar, said chamber for covering said A-pillar forming said front section and being separated from said chamber extending over said front side window, a separate gas generator being provided for inflating said chamber for covering said A-pillar, and said head-side gas bag, in its inflated condition, being attached to pillars of said vehicle.

2. The protection means as set forth in claim 1, wherein in the case of an offset head-on collision and a skew front-end collision only said chamber for covering said A-pillar is inflated.

3. The protection means as set forth in claim 1, wherein the vehicle additionally has a C-pillar, and wherein said inflated head-side gas bag extends up to said C-pillar of said vehicle.

4. The protection means as set forth in claim 1, wherein the vehicle has a side roof pillar and a C-pillar, and wherein said head-side gas bag has a front lower end and a rear lower end, extends from said A-pillar to said C-pillar, and is connected in the region of its front and rear lower ends with said A-pillar and said C-pillar, respectively.

5. The protection means as set forth in claim 1 for incorporation into a vehicle with a longitudinal axis, wherein said chamber for covering said A-pillar and said chamber extending over said front side window are inflated in case of a collision at an angle of approximately 60 degrees to said vehicle longitudinal axis.

6. A vehicle occupant protection means incorporated into a vehicle with an A-pillar and a B-pillar and a front side window, said protection means comprising a head-side gas bag having a deflated condition and an inflated condition, said gas bag in the inflated condition extending along the side of said vehicle over said A-pillar and over said B-pillar and over said front side window, at least one inflator for inflating said gas bag, said gas bag comprising an inflatable front section which covers said A-pillar at least to a major extent and blocks head contact with said A-pillar in the inflated condition of said gas bag, said gas bag also having a single inflatable chamber connected to said front section and in the inflated condition of the gas bag extending over said B-pillar and extending over a major portion of said front side window between the portion of the A-pillar which is extended over by said front section and the portion of the B-pillar extended over by said single inflatable chamber, said single inflatable chamber blocking head contact with said B-pillar and said front side window in the inflated condition of said gas bag.

7. The protection means as set forth in claim 6, wherein said front section blocks head contact with said A-pillar in the case of an offset head-on collision and a skew front end collision.

8. The protection means as set forth in claim 6, wherein said single inflatable chamber blocks head contact with said B-pillar and said front side window in the case of an offset head-on collision and a skew front end collision.

9. The protection means as set forth in claim 6, wherein said front section is separated from said single inflatable chamber and wherein a separate gas generator is provided for inflating said front section.

10. The protection means as set forth in claim 9, wherein in the case of an offset head-on collision and a skew front-end collision, said separate gas generator inflates said front section.

11. The protection means as set forth in claim 10, wherein in the case of an offset head-on collision and a skew front-end collision, only said front section is inflated.

12. The protection means as set forth in claim 6, wherein said front section is flowingly connected to said single inflatable chamber.

13. The protection means as set forth in claim 6, wherein said inflator is a multi-stage gas generator.

14. The protection means as set forth in claim 6, wherein the vehicle further includes a C-pillar, and wherein said inflated head-side gas bag extends over said C-pillar of said vehicle.

15. The protection means as set forth in claim 6, wherein the vehicle has a side roof pillar and a C-pillar, and wherein said head-side gas bag has a front lower end and a rear lower end, said head-side gas bag extending along the side of the vehicle and over said A-pillar and said C-pillar, said head-side gas bag being connected in the region of its front and rear lower ends to said A-pillar and said C-pillar, respectively.

16. The protection means as set forth in claim 6 for incorporation into a vehicle with a longitudinal axis, wherein said front section and said single inflatable chamber are inflated in case of a collision at an angle of approximately 60 degrees to said vehicle longitudinal axis.

* * * * *